US010797977B2

(12) United States Patent
Ramareddy

(10) Patent No.: US 10,797,977 B2
(45) Date of Patent: Oct. 6, 2020

(54) ROBUST SUSPENSION AND RESUMPTION OF DESKTOP VIRTUALIZATION

(71) Applicant: Citrix Systems, Inc., Fort Lauderdale, FL (US)

(72) Inventor: Shashidhar Ramareddy, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 871 days.

(21) Appl. No.: 15/076,805

(22) Filed: Mar. 22, 2016

(65) Prior Publication Data

US 2017/0279927 A1    Sep. 28, 2017

(51) Int. Cl.
| | | |
|---|---|---|
| *G06F 15/16* | (2006.01) | |
| *H04L 12/26* | (2006.01) | |
| *G06F 9/4401* | (2018.01) | |
| *G06F 9/451* | (2018.01) | |

(52) U.S. Cl.
CPC ........ *H04L 43/0811* (2013.01); *G06F 9/4418* (2013.01); *G06F 9/452* (2018.02); *H04L 43/10* (2013.01)

(58) Field of Classification Search
None
See application file for complete search history.

(56) References Cited

U.S. PATENT DOCUMENTS

| | | | | |
|---|---|---|---|---|
| 5,835,721 | A * | 11/1998 | Donahue | H04L 29/06 709/224 |
| 2004/0044761 | A1 * | 3/2004 | Phillipi | H04L 67/327 709/223 |
| 2009/0249332 | A1 * | 10/2009 | Hoehle | G06F 9/45558 718/1 |
| 2010/0332212 | A1 * | 12/2010 | Finkelman | G06F 1/3203 703/23 |
| 2011/0016417 | A1 * | 1/2011 | Shiplacoff | G06F 1/3275 715/768 |
| 2011/0022812 | A1 * | 1/2011 | van der Linden | H04L 67/1097 711/163 |
| 2012/0021778 | A1 * | 1/2012 | Ho | G01C 21/265 455/457 |
| 2012/0144233 | A1 * | 6/2012 | Griffith | G06F 11/1443 714/13 |
| 2012/0278475 | A1 * | 11/2012 | Papakipos | G06Q 10/10 709/224 |

(Continued)

Primary Examiner — Phyllis A Book
(74) Attorney, Agent, or Firm — Banner & Witcoff, Ltd.

(57) ABSTRACT

A method for suspending and resuming a connection for desktop virtualization between two computing devices. In response to a client computing device shutting down, suspending, hibernating, or losing network connectivity during virtualization, the server computing device may itself shut down, suspend, or hibernate, or may pause or suspend the operation of one or more applications currently hosted by the server computing device. The server may detect that connectivity has been restored and resume operation of hosted applications. Alternatively, the client may transmit a command to the server indicating that the client is ready to resume virtualization. The client may also be configured to transmit a command that may cause the server to resume a powered-on state after the server was shut down or in a state of hibernation.

21 Claims, 5 Drawing Sheets

(56) References Cited

U.S. PATENT DOCUMENTS

| | | | |
|---|---|---|---|
| 2014/0068302 A1* | 3/2014 | Falik | G06F 1/3206 |
| | | | 713/323 |
| 2014/0184475 A1* | 7/2014 | Tantos | H03M 13/356 |
| | | | 345/8 |
| 2014/0188977 A1* | 7/2014 | Song | H04L 67/10 |
| | | | 709/203 |
| 2014/0310546 A1* | 10/2014 | Gatta | G06F 1/3209 |
| | | | 713/320 |
| 2015/0067196 A1* | 3/2015 | Little | G06F 9/441 |
| | | | 710/14 |
| 2015/0323983 A1* | 11/2015 | Hobson | G06F 1/3296 |
| | | | 713/323 |
| 2016/0029203 A1* | 1/2016 | Finn | H04W 76/19 |
| | | | 455/418 |
| 2017/0177058 A1* | 6/2017 | Biggs | G06F 9/00 |

* cited by examiner

ROBUST SUSPENSION AND RESUMPTION OF DESKTOP VIRTUALIZATION

FIELD

Aspects described herein generally relate to systems for desktop virtualization across a network. More specifically, aspects provide for improving the functionality of desktop virtualization over an unreliable network connection by detecting that a connection between a virtualization server and a virtualization client has been lost and acting to ensure that the connection can be quickly resumed when the connection has been restored.

BACKGROUND

Desktop virtualization allows a user on a client computer to connect to a remote computer via software that both forwards user input from the mouse, keyboard, or other input devices of the client computer to an application running on the remote computer, and retrieves graphical user interface information from the application to display on the client computer. As a result, the user is able to control software running on the remote computer as if the user were directly using the remote computer. Users may be able to use specialized software available only on the remote computer, take advantage of the remote computer's greater processing power, or access files stored on the remote computer, thus increasing the flexibility and productivity of the user compared to using the client computer alone, or compared to interacting with the remote computer only through an API or other protocol. However, the advantages of virtualization depend completely on a reliable network connection between the client and remote computers to convey user input to the remote computer and the graphical user interface or other data to the client computer.

Present virtualization software solutions respond to a network connectivity loss by spending a predetermined amount of time attempting to re-establish the connection. During this time, the software on the remote computer continues to run, even though the user is unable to see or affect it while the connection is unavailable. Outgoing data from the software on the remote computer will be buffered in hopes that the network connection will be re-established, after which the contents of the buffer can be sent to the client computer. However, any buffers for outgoing data from the remote computer will quickly fill, especially if the client computer was receiving a large file transfer from the remote computer or was using the remote computer to watch streaming video content. Even if the network connection is restored before the predetermined time has elapsed, the inability to write to the buffer after it has filled may cause a file transfer to fail, may cause video content to fail to display to the user on the client computer, or may cause other software running on the remote computer to fail in response to not receiving expected input from the client or receiving an error when attempting output to the client.

Present virtualization software solutions respond to a longer period without network connectivity by deleting the session data indicating that the user on the client computer was authorized to view and control the software on the remote computer. If the longer period of time has elapsed without resuming the connection, the user may be forced to re-initiate the virtualization session, re-enter credentials and/or initiate a two-factor authentication scheme, and wait for the session to be established, in addition to the buffering and transfer failure described above. If the session created a virtual machine on the remote computer instead of controlling the remote computer directly, the virtual machine may be deleted and any progress or changes lost. This may lead to significant user frustration and lost productivity if a connection is intermittent and often fails repeatedly for intervals of time. Work can also be lost if the user turns off the client computer without saving his work and the session data or virtual machine are destroyed.

Aspects described herein address these and other concerns.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to suspending one or more virtualized applications on a server computer in response to determining that the connection with the client computer is no longer effective, and automatically resuming the one or more applications on the server in response to determining that the connection with the client computer has been re-established thereby handling lost network connections without losing information or progress, and for re-establishing the connection as quickly and painlessly as possible.

Network connectivity may be lost either due to actual lost packets or increased latency over a network connection, or due to a powering down of the client computer itself such that it is no longer capable of transmitting over a network connection. Similarly, network connectivity may be re-established by improved network speed and reliability, or by a powered-down device powering back up. The states of lost network connection and re-established network connection may be determined either by analysis of network traffic or by affirmative notifications of what a computer's future network connectivity may be.

In response to determining that network connectivity has been or may be lost, the server hosting the virtualized applications may suspend the operation of the applications. Suspension may involve storing the current application state in volatile memory on the server, storing the current application state on a disk on the server, or even causing the entire server to sleep, hibernate, or shut down. By storing the application state where it can easily be retrieved and resume processing, the connection can be quickly re-established and the client computer may continue receiving data from the virtualized application without re-entering credentials or waiting for a session with the server to be re-created.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
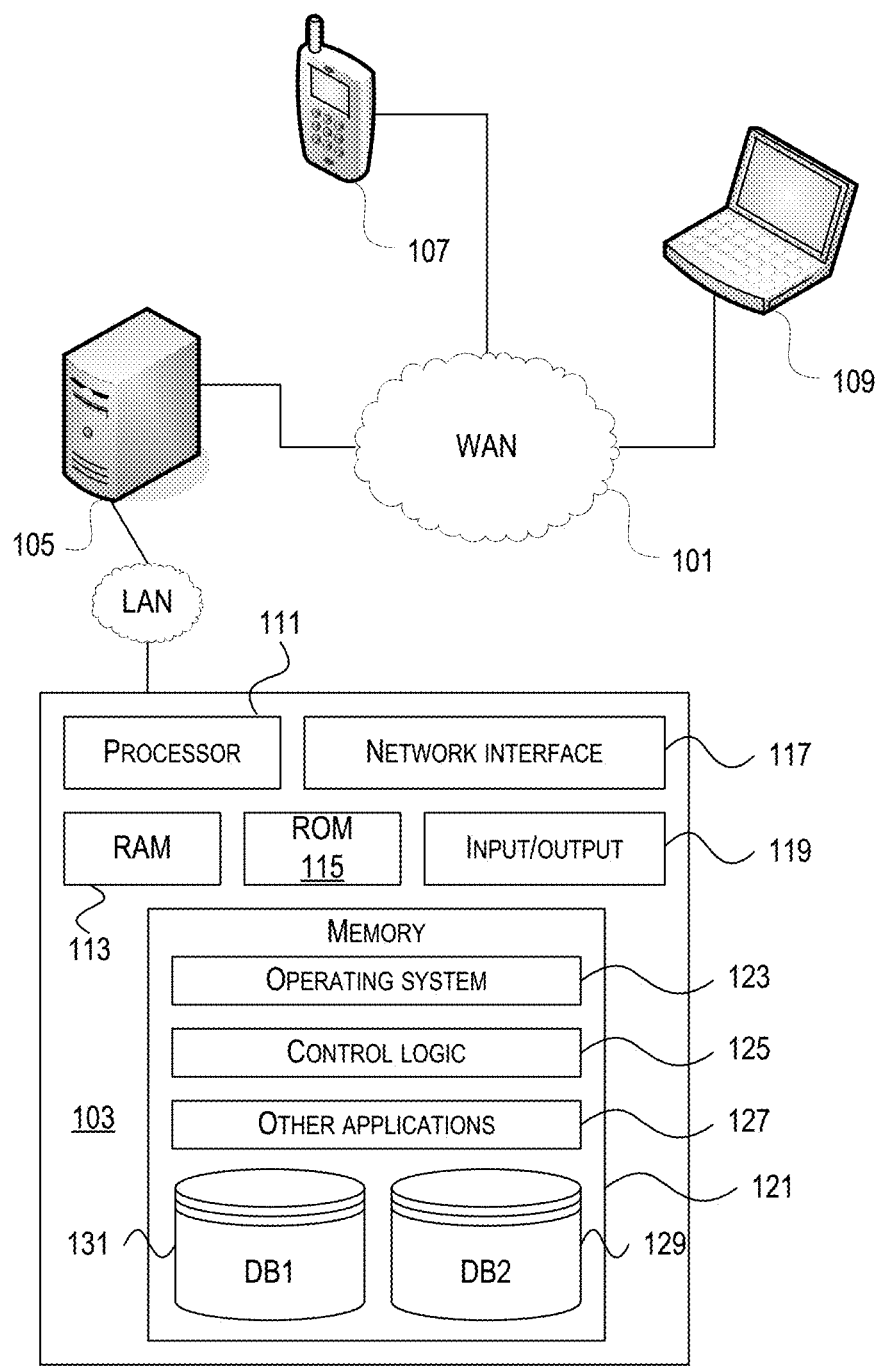
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
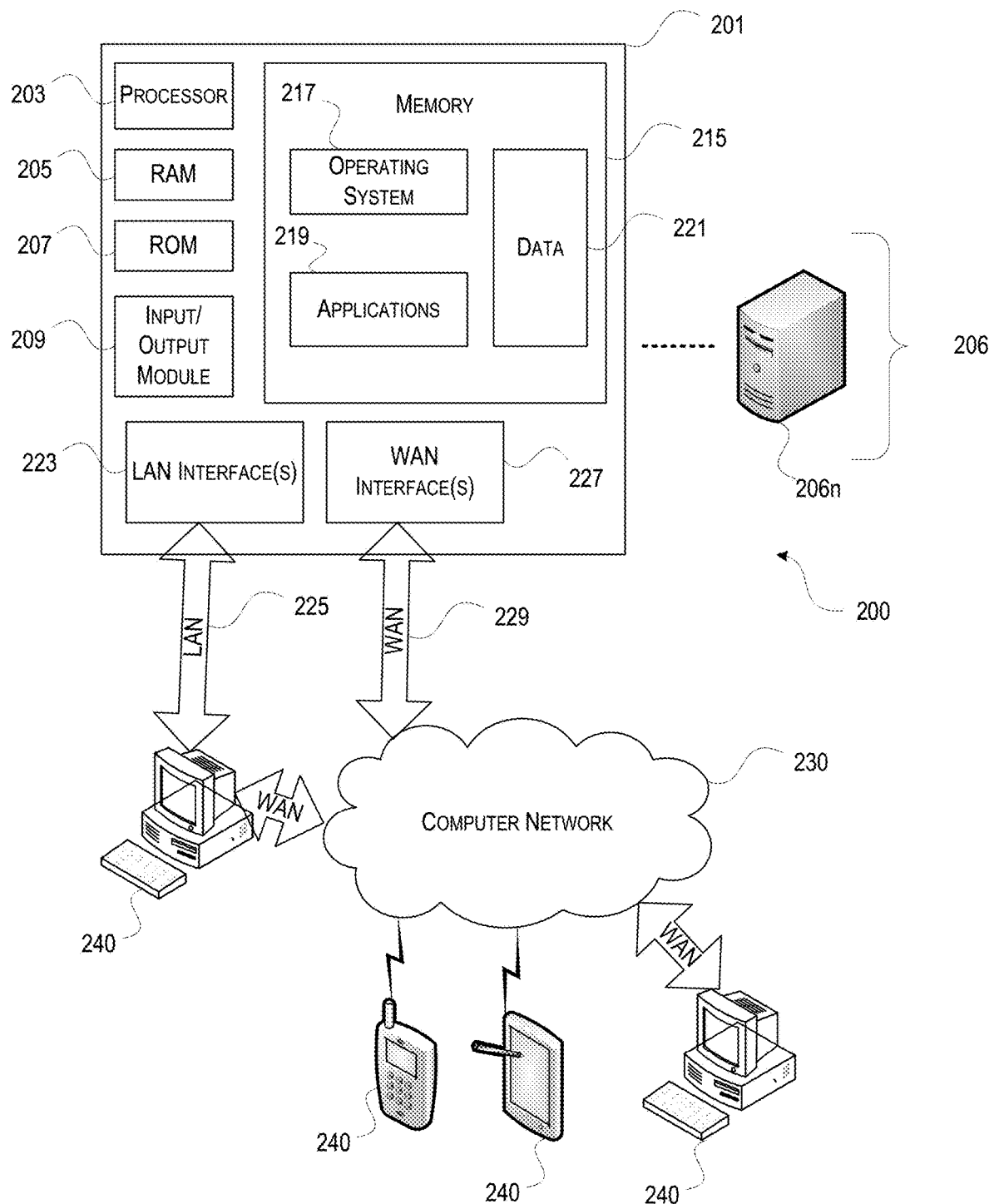
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
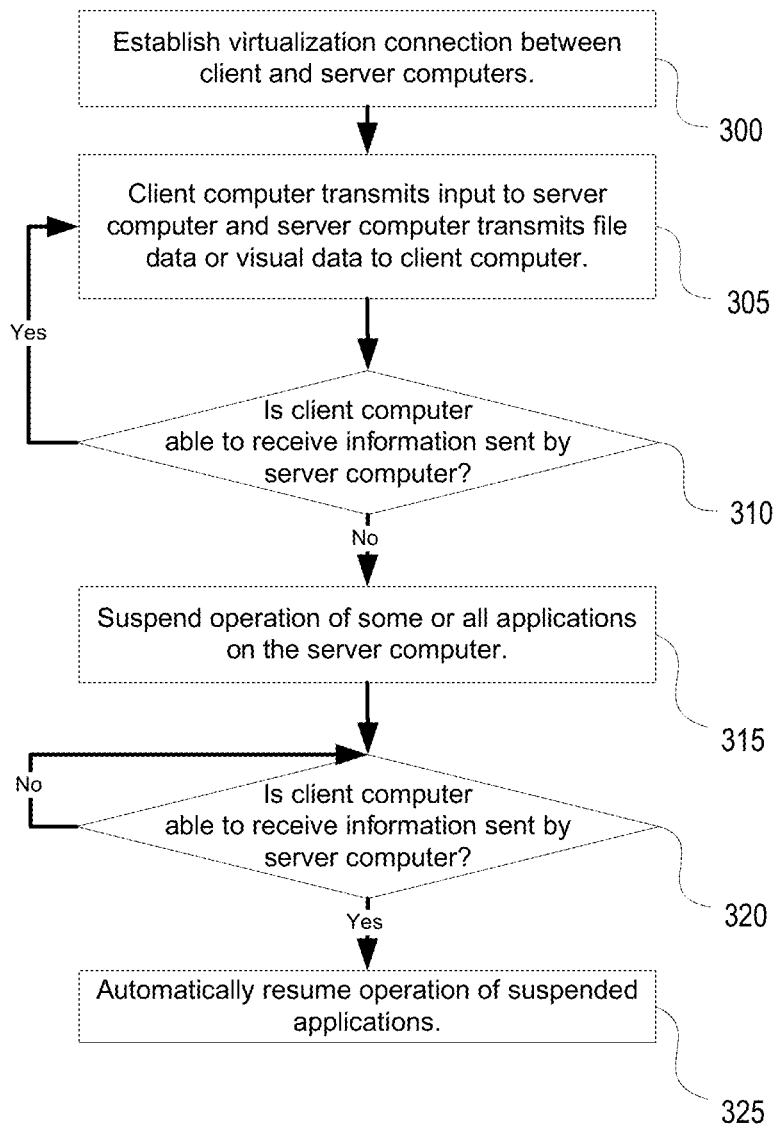
FIG. 3 depicts a method for suspending and resuming an application when a client to server connection is lost.

FIG. 3 illustrates a method of virtual application suspension and resumption according to the present invention.

In step 300, a connection is established between a client computing device and a server computing device. The connection may involve exchange of authorization information, such a username and password or two-factor authentication, in order to determine that a user of the client computing device has authority to access files and software on the server computing device or a virtual machine generated by the server computing device.

In step 305, once the connection is established, the client device may routinely transmit commands entered by the user on the client device via keyboard, mouse, microphone, or other input devices. The client device may also transmit information about the client device itself, such as a listing of file directories on the client device or information on output capabilities of the client device. The user may be able to perform any number of actions on the server device, such as opening a file, running an application, viewing video content, or transferring a file from a directory on the server device to a directory on the client device, all of which may be accomplished by entering input on the client device and the results of which may be viewed on a display of the client device. The client device may send at regular intervals a "ping" or other routine message to the server device to confirm that the client device is still receiving visual data from the server device. These messages may be sent every minute, every number of seconds, every second, or multiple times per second.

In step 310, a determination may be made that the client device is no longer able to receive visual data from the server device. This determination may be made upon a fixed interval of time, such as one minute, a number of seconds, or one second, elapsing without receiving a ping from the client device, possibly indicating that the network connection is broken, has insufficient bandwidth for all communications, has intolerably increased latency, or is undergoing filtering or censorship that prevents client device messages from being successfully transmitted to the server device. Alternatively, the determination may be made based on the fact that the client device is no longer capable of receiving visual data or file transfers sent by the server device. This determination could be made subsequent to a notification message sent by the client device that a power source or battery of the client device is critically low, that the client device has a power button which has been pressed by the user, that the client device has a hibernate or suspend button which has been pressed by the user, or that the user has deactivated a display of the client device, such as by turning off a monitor or closing a laptop. In the event that an imminent connection loss is known in advance, desktop virtualization software running on the client device may prompt the user of the client device to decide whether to suspend software execution on the server device. If the user selects yes in response to this prompt, steps 315, 320, and 325 may be performed, and if the user selects no in response to the prompt, the method may conclude without performing steps 315, 320, or 325.

In step 315, one or more applications on the server device are suspended. This may comprise completely shutting down the server device, suspending or hibernating the server device into a low power mode so that all application data is saved to disk or retained in volatile memory while the processor is deactivated, ceasing execution of commands of a single application on the server device while the application data is retained in volatile memory, caching a specific virtual machine instance generated on the server device, or any other manner of retaining the application data without actively executing it.

In step 320, the server enters a listening loop, waiting for an indication that the client device is able and ready to receive data from the application on the server device. The indication may be the receipt of a client device ping message, indicating that network connectivity has been restored. Alternatively, the indication may be a message from the client device indicating that the client device has been restored to full power and that the display of the client device is active and ready to receive visual content.

In step 325, after determining that the connection between the client device and server device is capable of restoration and the client device is ready, a suspended application may be resumed. Resumption may comprise turning the server device back on from a powered down, suspended, or hibernation state, such as with a Wake-On-LAN message, sleep proxy wake-on-demand message, or other message that may be processed by a networking component even if the server device is in a no-power or low-power state. Resumption may comprise restoring cached data of an application state from a disk to volatile memory, and may comprise assigning processor time to an application in volatile memory that was not being processed. Resumption may comprise restoring a suspended virtual machine or recreating a virtual machine from saved data.

Figure 4:
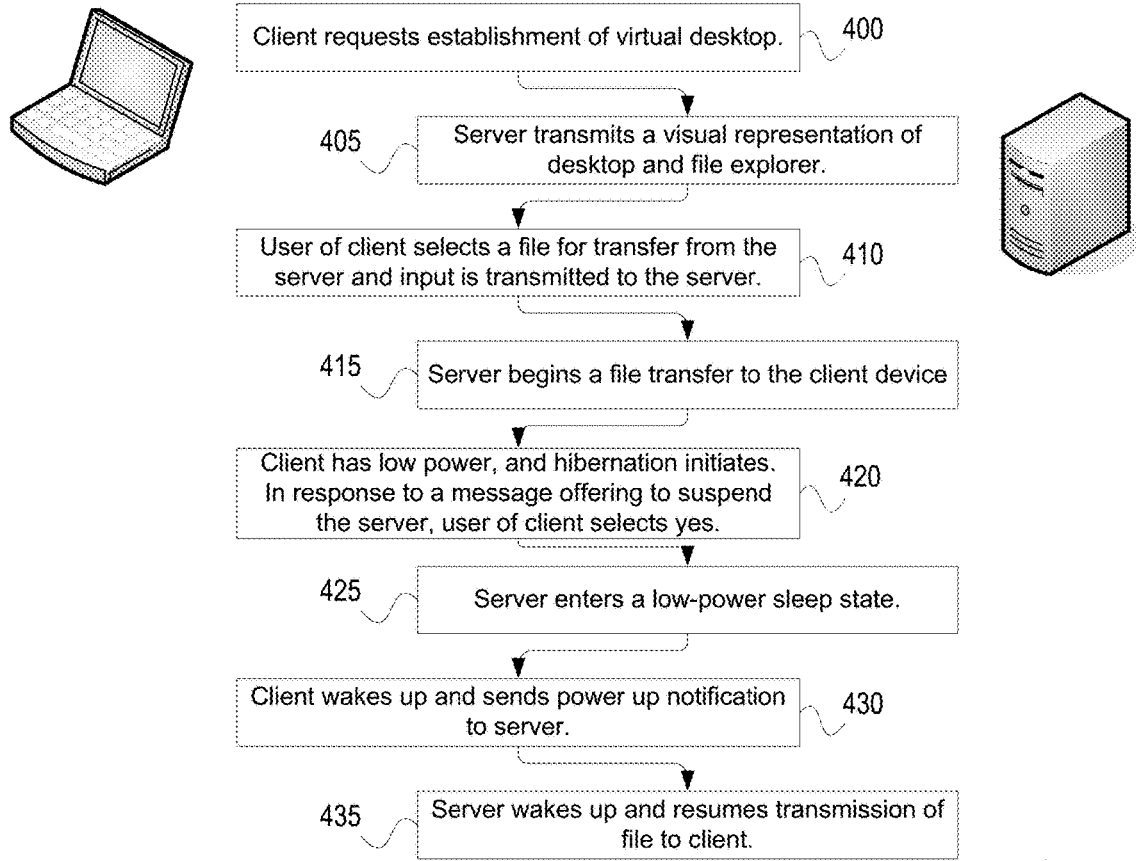
FIG. 4 depicts an illustrative embodiment that suspends and resumes an application in response to a client computer suspension.

FIG. 4 depicts a non-limiting illustrative embodiment.

In step 400, a user may use a laptop computer to connect to a desktop computer he owns and which is currently located elsewhere. The user may enter, for example, an internet protocol (IP) address, username, and password which have been set up in advance on the desktop computer via server software running on the desktop computer.

In step 405, the desktop computer sends a visual representation of the desktop and applications installed on the desktop computer, such that at least a portion of the laptop screen appears to show what a user of the desktop computer would see on a monitor attached to the desktop computer. The desktop computer also sends a representation of a file explorer application that shows both drives and directories on the desktop computer and drives and directories on the laptop computer.

In step 410, the user navigates the file explorer to select a file and drag it to a directory on the laptop computer. The mouse input is conveyed to the desktop computer for processing by the server software installed thereon.

In step 415, the desktop computer begins transmitting the selected file to the laptop computer to assemble a copy of the file on the laptop.

In step 420, before the file transmission is complete, the laptop determines that it has limited battery power and alerts the user that hibernation may initiate soon. The desktop virtualization software may note the low power and prompt the user to decide whether to suspend software currently being executed on the server after the client hibernates. The user may select yes and allow the operating system to begin hibernation. The operating system of the laptop computer may be modified to transmit a message to the desktop computer when hibernation is initiated, or may send a notification of impending hibernation to client software running on the laptop computer and allow that software to transmit a message indicating the user's choice to suspend to the desktop computer before suspending the software and hibernating.

In step 425, in response to receiving the message from the laptop computer, the desktop computer immediately enters a low-power sleep state, where all applications are kept in volatile memory with power to the memory, but not the processor. The file explorer thus ceases transmitting portions of the file to the laptop computer.

In step 430, the user moves his laptop to a new location with a power source and re-opens his laptop. The laptop wakes up and transmits a message to the desktop computer indicating that the hibernation is over.

In step 435, the networking component of the desktop receives the message and uses Wake-on-LAN functionality configured on the desktop to end sleep mode and fully power the desktop computer. The file explorer resumes transmission of the file and the laptop continues receiving packets with portions of the file without any having been transmitted and lost after the laptop hibernated.

Figure 5:
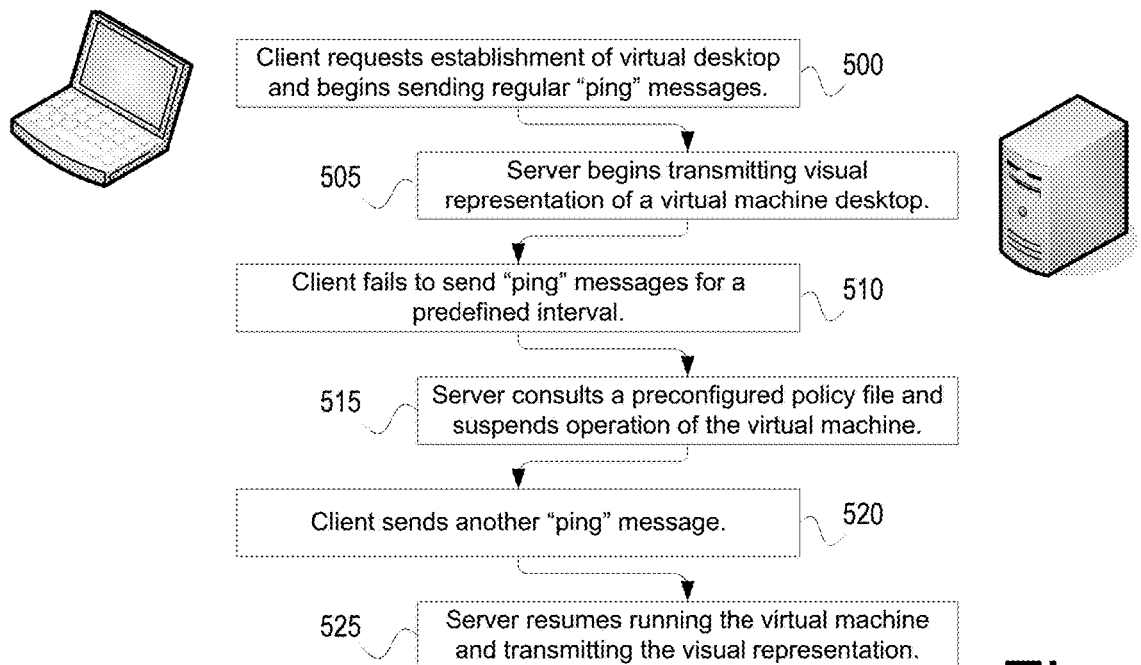
FIG. 5 depicts an illustrative embodiment that suspends and resumes an application in response to a loss of network connectivity.

FIG. 5 depicts a non-limiting illustrative embodiment.

In step 500, a user may use a laptop computer as a thin client that is only capable of connecting to a hypervisor server that may generate a virtual machine for the laptop. The laptop connects to the server and transmits its credentials. Throughout the connection, the laptop may send ping messages to the server every 0.1 seconds even if there is no user input to convey, in order to confirm that the laptop is still connected.

In step 505, the server generates the requested virtual machine and begins transmitting a visual representation of it to the laptop to be viewed and interacted with by the user of the laptop.

In step 510, the laptop loses network connectivity due to wireless interference. Accordingly, none of the ping messages it sends are successfully received by a wireless router and conveyed to the server.

In step 515, the server determines that a number of seconds have elapsed without a ping message or input from the laptop. The server may consult a configuration file that was installed with the software or set by a user or administrator to determine that a maximum time has elapsed without receiving ping messages to demonstrate that the connection is still alive. In response, the server suspends the virtual machine, caching all data related to it to disk as a saved file. The server continues operating other virtual machines for other client devices from which the server is still receiving ping messages.

In step 520, the network connectivity is restored and the ping messages from the laptop successfully cross the network to the server.

In step 525, the server retrieves the saved file and uses the data in the file to re-instantiate the virtual machine as it was at the moment the laptop lost network connectivity, resuming transmission of the visual representation of the virtual machine to the laptop.

Figure 6:
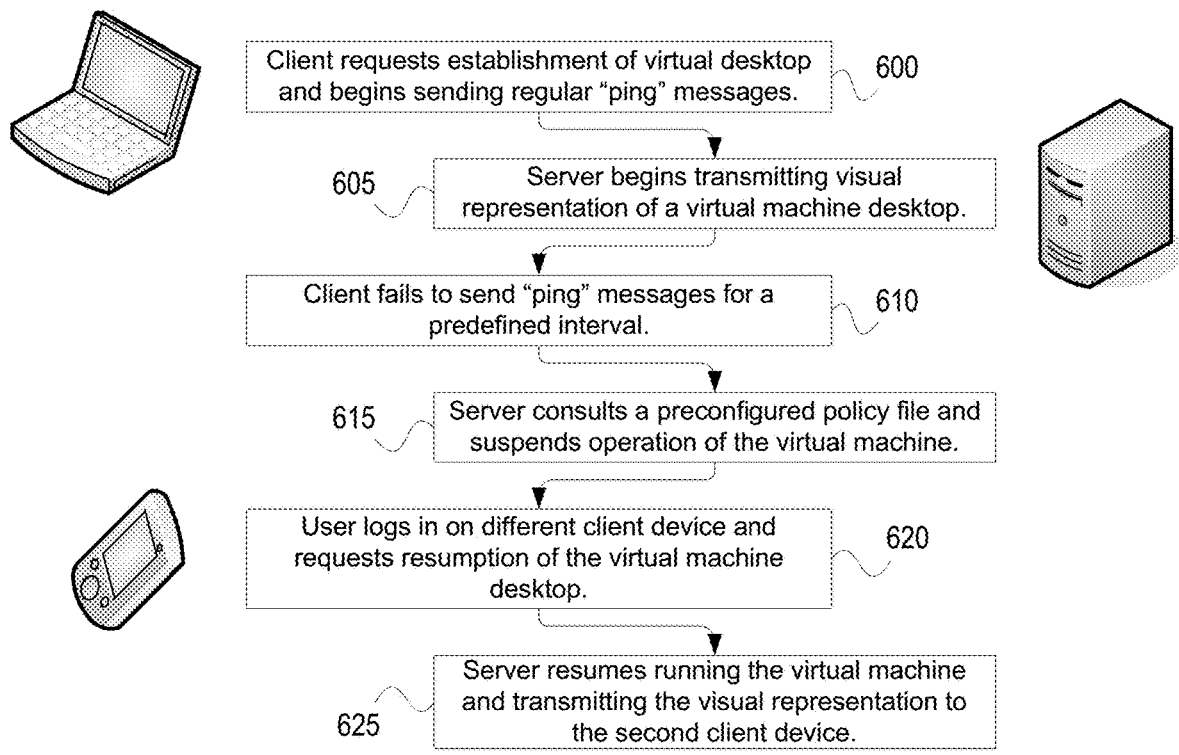
FIG. 6 depicts an illustrative embodiment that suspends an application provided to a first client device and resumes the application for provision to a second client device.

FIG. 6 depicts a non-limiting illustrative embodiment.

In steps 600, 605, 610, and 615, a laptop and server interact with each other as in steps 500, 505, 510, and 515 to establish a virtual desktop connection and in response to a loss of network connectivity, suspend operation of a virtual machine.

In step 620, the user uses a different mobile device, such as a mobile phone or tablet, to enter credentials and connect to the server.

In step 625, in response to receiving the connection request with credentials, the server determines that there is a suspended virtual machine that was created for the user with the same credentials. The server retrieves the saved file caching the virtual machine and uses the data in the file to re-instantiate the virtual machine as it was at the moment the laptop lost network connectivity, transmitting the visual representation of the virtual machine to the mobile device instead of the laptop. The user is then able to continue the session and work the user was performing before the connectivity loss despite using a different device to connect.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method, comprising:
   establishing a desktop virtualization session between a client device and a computing device over a network connection, the desktop virtualization session configured to enable the client device to access one or more applications hosted by the computing device;
   determining, by the computing device, that the network connection has been lost based on detection of an interruption in the network connection or deactivation of a display of the client device;
   suspending, by the computing device, operation of the one or more applications in response to the determination that the network connection has been lost, wherein the suspension further comprises retaining data indicative of a state of the one or more applications;
   determining, by the computing device, that the network connection has been re-established based on receipt of an indication that the client device is able to receive data from the one or more applications; and
   resuming, by the computing device, the operation of the one or more applications with use of the retained data and in response to the determination that the network connection has been re-established.

2. The method of claim 1, wherein the suspending operation of the one or more applications comprises causing the computing device to enter an operating system sleep or suspend mode.

3. The method of claim 1, wherein the suspending operation of the one or more applications comprises causing the computing device to enter an operating system hibernate mode and to power down.

4. The method of claim 1, wherein the suspending operation of the one or more applications comprises causing an application hosted by the computing device to enter a pause mode.

5. The method of claim 1, wherein the determining that the network connection has been lost comprises determining, by the computing device, that a predetermined interval of time has elapsed without receiving network traffic from the client device.

6. The method of claim 1, wherein the determining that the network connection has been lost comprises determining that a user has powered down or suspended operation of the client device.

7. The method of claim 1, wherein the determining that the network connection has been lost comprises determining that a buffer for outgoing data transmission is full.

8. The method of claim 1, wherein the determining that the network connection has been re-established comprises receiving network traffic from the client device subsequent to the determining that the network connection has been lost.

9. The method of claim 1, wherein the determining that the network connection has been re-established comprises receiving a reconnection message from the client device.

10. The method of claim 1, wherein the resuming the operation of the one or more applications comprises turning on the computing device and resuming from an operating system hibernation mode on the computing device.

11. The method of claim 1, wherein the resuming the operation of the one or more applications comprises deactivating an operating system sleep or suspend mode on the computing device.

12. One or more non-transitory computer-readable media storing computer instructions that, when executed, cause a client device to:
   establish a network connection for desktop virtualization with a computing device;
   determine, by the computing device, that the network connection has been lost based on detection of an interruption in the network connection or deactivation of a display of the client device;
   transmit an instruction causing one or more applications used during the desktop virtualization to suspend performance of the one or more applications on the computing device in response to the determining that the network connection has been lost, wherein the suspending performance further comprises retaining data indicative of a state of the one or more applications;
   determine that the network connection has been re-established based on receipt of an indication that the client device is able to receive data from the one or more applications; and
   transmit an instruction causing the one or more applications to resume performance, based on the retained data and in response to the determining that the network connection has been re-established.

13. The computer-readable media of claim 12, wherein the determining that the network connection has been lost comprises determining that a user has issued a hibernate command to the client device or the computing device.

14. The computer-readable media of claim 12, wherein the determining that the network connection has been lost comprises determining that no network traffic has successfully been sent between the client device and the computing device for a predetermined interval of time.

15. The computer-readable media of claim 12, wherein the transmitting the instruction causing one or more applications used during the desktop virtualization to suspend performance comprises transmitting a command to power down the client device.

16. The computer-readable media of claim 12, wherein the transmitting the instruction causing the one or more applications to resume performance comprises using an operating system application programming interface of the client device to cause the client device to power on and resume an active operating system mode.

17. The computer-readable media of claim 12, wherein the transmitting the instruction causing the one or more applications to resume performance comprises using an operating system application programming interface of the computing device to cause the computing device to power on and resume an active operating system mode.

18. A system, comprising:
- a client device; and
- a server computing device, wherein the server computing device comprises non-transitory memory storing computer instructions that, when executed by a processor of the server computing device, cause the server computing device to:
  - receive a request to host a hosted application for the client device;
  - transmit hosted application data to the client device;
  - determine, by the server computing device, that a network connection through which the hosted application communicates with the client device has been lost based on detection of an interruption in the network connection or deactivation of a display of the client device;
  - suspend operation of the hosted application at the server computing device in response to the determination that the network connection has been lost, wherein the suspending operation further comprises retaining data indicative of a state of the hosted application;
  - determine that the client device is able to receive data, based on receipt of an indication that the client device is able to receive data from the hosted application; and
  - automatically resume the operation, based on the retained data associated with the hosted application and in response to the determination that the network connection has been re-established, of the hosted application at the server computing device.

19. The system of claim 18, wherein determining that the hosted application data is not being received by the client device comprises receiving a notification that a processor of the client device ceased being powered.

20. The system of claim 18, wherein determining that the client device is able to receive data comprises receiving a notification that a processor of the client device resumed being powered.

21. The method of claim 1, further comprising:
- determining, by the computing device, that the network connection has been lost;
- storing, upon suspending operation, by the computing device, a state of the desktop virtualization session at a time that the network connection was lost; and
- restoring, upon resuming the operation of the one or more applications, by the computing device, the desktop virtualization session with the use of the stored state of the desktop virtualization session at the time that the network connection was lost.

* * * * *